Nov. 12, 1940.  G. S. GROSCH  2,221,186
POWER DIVIDING DIFFERENTIAL MECHANISM
Filed July 19, 1940
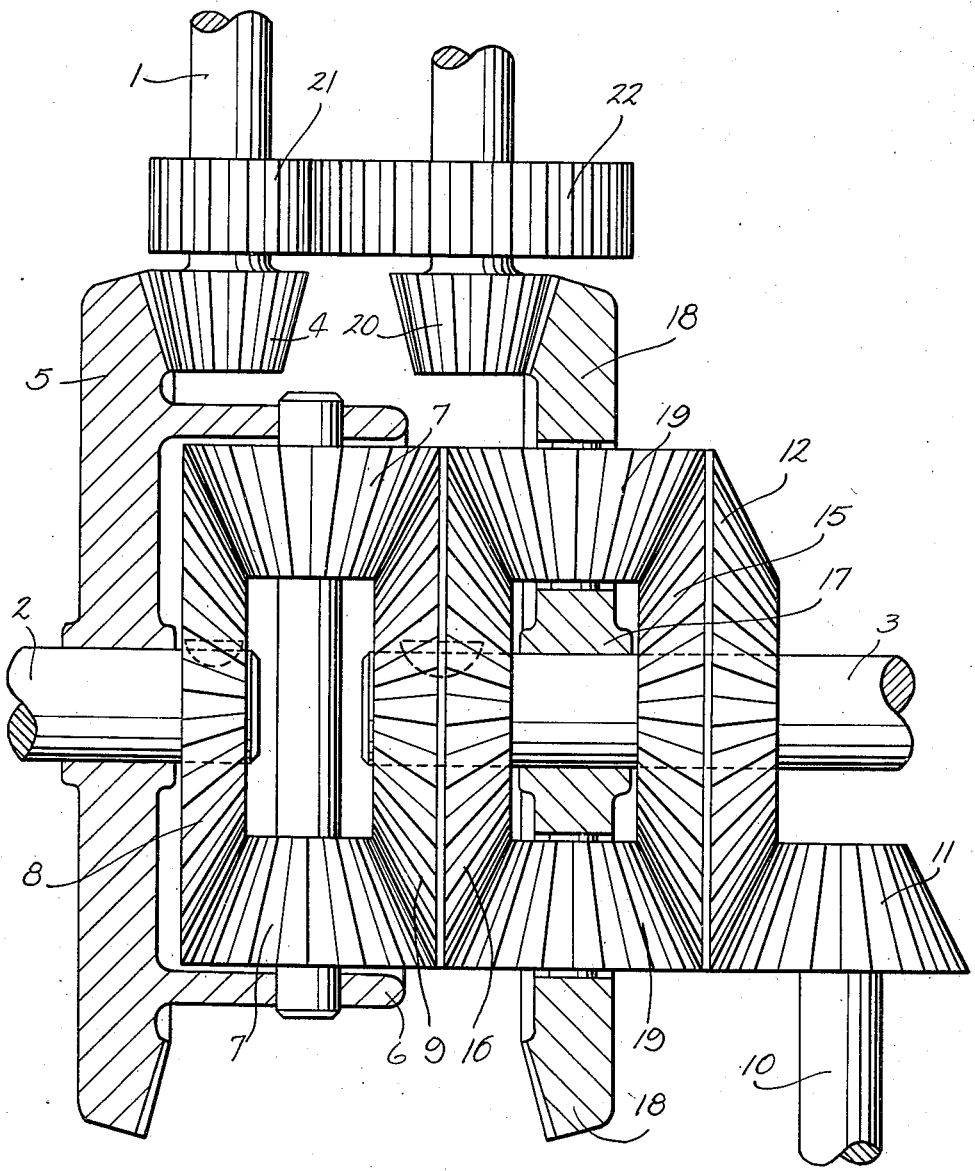
INVENTOR
George S. Grosch
BY
Wheeler, Wheeler & Wheeler
ATTORNEYS.

Patented Nov. 12, 1940

2,221,186

UNITED STATES PATENT OFFICE 2,221,186

POWER DIVIDING DIFFERENTIAL MECHANISM

George S. Grosch, Milwaukee, Wis.

Application July 19, 1940, Serial No. 346,280

6 Claims. (Cl. 74—310)

This invention relates to improvements in power dividing differential mechanisms.

It is the primary object of the invention to provide a novel and improved differential mechanism for dividing power between two driven shafts and for integrating, unitarily in the same mechanism, the motion derived from two different sources whereby a control shaft not normally subject to load may be used to control the differential action to advance either of the driven shafts and retard the other while maintaining a constant supply of power from the primary source to both of said shafts.

It is a further important object of the invention to provide a power apportioning differential in which the gearing subject to load moves only in response to differential movement and is not in continuous operation, the only continuously operable gears being those which are normally idle.

I am aware of the fact that various devices have heretofore been suggested for effecting differential movement as between two differentially driven parts such as the wheels of a tractor. As distinguished from such devices previously suggested, it is an important objective of the present invention to provide means whereby the steering differential movement whereby one of the driven shafts is advanced and the other retarded, is brought about in the primary differential itself, as a unitary feature of the differential assembly.

The drawing diagrammatically illustrates a preferred embodiment of the invention, the ring gears being shown in section and the other gearing in plan.

One important application of the invention involves the steering of vehicles such as tractors and particularly track laying tractors. In any vehicle steering may be effected by accelerating the rotation of one of the driving wheels while correspondingly decelerating the rotation of the opposite driving wheel. The drive is also adaptable, however, to many other installations as, for example, to printing presses and the like, where it may be desired to advance one press cylinder with respect to another in order to re-establish registration between their respective impressions.

Power is received from a suitable prime mover through the shaft 1. The driven shafts requiring differential coordination are shown at 2 and 3. The driving shaft 1 and the driven shafts 2 and 3 are connected through a generally conventional differential mechanism in which the driving pinion 4 actuates a ring gear 5 carrying a cage 6 which supports the differential pinions 7. Operatively meshing with the differential pinions 7 are the differential gears 8 on shaft 2 and 9 on shaft 3 respectively. In order to simplify the disclosure no bearings for the various shafts or gears are illustrated. The keys shown in dotted lines indicate that the gears 8 and 9 are made fast to their respective shafts 2 and 3. The absence of the key indicates that the differential ring gear 5 turns free with respect to shaft 2.

Obviously the arrangement thus far described is such that power will be transmitted from shaft 1 to rotate shafts 2 and 3 uniformly save for such differential action as may occur between the shafts accommodated by the rotation of the pinions 7 between gears 8 and 9.

A normally stationary control shaft 10 is provided with a pinion 11 meshing with a normally stationary gear 12. The control shaft 10 may be manually driven or driven by power, according to the requirements of the installation in which the transmission is used.

Back to back with gear 12, as an integral part thereof, is a gear 15. Back to back with gear 9 as an integral part thereof, is a gear 16. While these pairs of gears are shown integrally united it will, of course, be understood that any driving connection between them will serve the purposes of the present invention.

Mounted to turn free with respect to shaft 3, is a spider 17 peripherally provided with ring gear 18 and supporting pinions 19 meshing between gears 16 and 15. Since the differential comprising gears 8 and 9 between shafts 2 and 3 is intended to function normally in the usual manner, it will be obvious that shafts 2 and 3 will ordinarily be operated at the same rate by the power furnished through shaft 1. In order that the gear pair comprising gears 9 and 16 may rotate at the rate of shaft 3, while the gear pair comprising gears 12 and 15 is stationary, it is necessary that the pinions 19 have a planetary movement and that spider 17 rotate with such pinions at half the speed of rotation of shaft 3.

Accordingly, the ring gear 18 carried by spider 17 is driven by pinion 20 and by gears 21 and 22 directly from the power shaft 1, the various gear ratios being such as to turn the spider at half the rate at which the shaft 3 operates. In the device as illustrated, the ratio of pinion 20 to gear 18 is identical with the ratio of pinion 4 to gear 5 and consequently the desired half speed relationship is achieved by having gear 21 exactly half the radius of gear 22. If the ratios of one drive were to be changed a compensating change would have to be made in the ratios of the other drive in order to maintain the half speed drive to the spider 17 which enables such spider and the pinions carried thereby to rotate idly so long as the control shaft 10 and the gear pair 12, 15, remain stationary.

Assuming that it is desired to produce differential motion between shafts 2 and 3 without in any manner interrupting the flow of power to such shafts, it is only necessary to positively rotate shaft 10 either clockwise or counterclockwise. If shaft 10 and the pinion carried thereby are turned to the right as viewed in the drawing, the gear pair 12, 15, will be rotated to turn toward the top of the sheet and this motion, transmitted through the otherwise idling planetary motion of the pinions 19, will decelerate gear pair 9, 16, and correspondingly accelerate gear 8 to advance shaft 2 and retard shaft 3 while permitting such shafts to continue their normal rotation toward the top of the sheet.

Assuming that control shaft 10 is turned to the left as viewed in the drawing, gear pair 15, 12, will be turned toward the bottom of the sheet and upon the normal idling planetary movement of pinions 19 will be superimposed the motion derived from gear pair 15, 12 to accelerate the motion of gear pair 9, 16, thereby causing the differential mechanism to decelerate the motion of gear 8 whereby shaft 2 will be decelerated and shaft 3 accelerated in this instance.

It is to be noted that throughout the functioning of the device the control shaft 10 remains substantially free of load. In other words, assuming that the load on the driven shafts 2 and 3 is normally balanced, the drive thereto will remain normally balanced while the control shaft 10 is stationary. When the control shaft 10 is operated in either direction its effect is to produce a redistribution of load as between the shafts 2 and 3. Since the one shaft will be retarded in the same proportion that the other shaft is advanced, and since the load on the retarded shaft will be decreased in substantially the proportion in which the load on the advanced shaft is increased, it will be obvious that a relatively slight amount of power applied to the control shaft will be able to control the differential movement between shafts 2 and 3. In no event will the control shaft be obliged to furnish the entire power required to advance one of the driven shafts, such power being at least partially compensated by a retarding of the other driven shaft and the consequent redistribution of power in the primary differential, 5, 6, 7, 8, 9.

It will, of course, be understood that numerous changes may be made within the principle of the present invention. Other types of differentials may be substituted for those disclosed and, wherever self-locking is desired, worms and worm gears of proper ratio may be substituted for bevel or spur gears illustrated. I further contemplate changes in design incidental to the provision of suitable bearing supports wherever required in a particular installation.

I claim:

1. In a differential transmission, the combination with a driving cage and driven gears, of differential gearing carried by said cage and operatively connected with said driven gears for the equalization of motion therebetween, a normally stationary control member for advancing one of said gears with respect to the other, said control member being co-axial with one of said gears, a motion transmitting driving element mounted for planetary revolution respecting said control member and said last mentioned gear and in operative driving connection with said member and gear, and means for positively regulating the revolution of said driving element at one half the rate of rotation of said gear.

2. A device of the character described, comprising the unitary combination with a primary differential comprising a driving cage, driven gears, and differential gearing carried by the cage and in operative connection between said gears, and driving means connected with the cage for the operation thereof, of a first control gear operatively connected to turn in unison with one of the driven gears of said differential, a second control gear coaxial with the first mentioned control gear and normally stationary, a control element provided with an operative driving connection to said normally stationary control gear, a mount provided with means supporting it for rotation coaxially with said control gear, gearing carried by said mount and revoluble thereon and operatively meshing with said first and second control gears for planetary movement therebetween, and reduction gearing operatively connecting said driving means with said mount for the operation of the mount at one half the rate of operation of the cage for accommodating movement of one of the control gears in accordance with the movement of the driven gear connected therewith while the other of said control gears is stationary, whereby said control element will be affected by differential action between the driven gears and the primary differential and the relative movement of said driven gears may be varied by the movement of said element.

3. The combination with a primary differential including driving means, a cage, driven gears and gearing carried by the cage and in operative mesh between the driven gears, of a control device in unitary assembly with said differential comprising a normally stationary control part, means differentially movable between said stationary control part and one of the driven gears of said differential, and driving connections from said driving means to said differentially movable means for the actuation of said last means at a rate at which said control part is stationary, whereby the movement of said part may be communicated to said last mentioned driven gear for effecting relative displacement of the driven gears in the course of their rotation.

4. A unitary differential transmission comprising the combination of a pair of coaxial driven gears, a pair of coaxial control gears aligned with said driven gears and one of said control gears and one of said driven gears being positively connected, the other of said control gears being normally stationary, a control shaft provided with an operative driving connection to the normally stationary control gear, a driving cage provided with a bearing support upon which it is revoluble coaxially with said gears, differential gearing carried by said cage and operatively meshing between said driven gears, a second driving cage provided with bearings upon which it is revoluble coaxially with said gear, differential gearing carried by the second cage and operatively meshing between said control gears, and driving connections for said cages including means for actuating said second cage at a speed approximating half of the speed of operation of the first cage, whereby to permit said second control gear to remain stationary except when actuated by said control shaft for the displacement of one of said driven gears with respect to the other.

5. In a unitary differential transmission system, the combination with a driving shaft and aligned driven shafts, of driven gears on the driven shafts, a first differential cage coaxial with said driven shafts and provided with a ring gear, a pinion on the driving shaft meshing with the ring gear, differential gearing carried by the cage and in operative mesh between the driven gears on the driven shafts, a first control gear connected to one of said driven gears, a second control gear coaxial therewith, a second differential cage mounted to turn coaxially with said control gears, differential gearing in operative connection between the control gears and adapted for planetary movement with said second cage, means for driving said second cage from said drive shaft at one half the rate of rotation of the first cage, whereby to permit said second control gear to remain normally stationary during the movement of the first control gear and the driven gears, and a control means provided with an operative driving connection to said control gear whereby to move said gear and to transmit motion to the first control gear during the movement thereof to accelerate or decelerate the movement of one of the driven gears with respect to the other while both receive power from said driving shaft.

6. In a device of the character described, the combination with a driving shaft and aligned driven shafts, of driven gears mounted coaxially upon the driven shafts and fixed thereto, a first differential cage rotatable coaxially with the driven gears and provided with a ring gear, a pinion on the driving shaft meshing with the ring gear for the operation of said cage, differential gearing carried by the cage and operatively meshing with the driven gears, a first control gear connected to one of the driven gears and coaxial therewith, a second control gear coaxial with said first mentioned gear, a second differential cage rotatable coaxially with said gear, differential gearing carried by the second cage for planetary movement with respect to the control gears and operatively meshing therebetween, a ring gear carried by the second differential cage, a pinion meshing with said ring gear, reduction gearing operatively connected between said drive shaft and said last mentioned pinion for the operation of said second cage at one half the rate of rotation of the cage first mentioned, whereby said second control gear will normally remain stationary during the planetary movement of the differential gearing carried by the second cage, and control means for rotating said second control gear for the relative displacement of one of said driven gears with respect to the other in the course of their mutual rotation.

GEORGE S. GROSCH.